United States Patent
Vetter

[15] 3,694,421
[45] Sept. 26, 1972

[54] PROCESS FOR THE POLYMERIZATION OF OLEFINS

[72] Inventor: Hans-Joachim Vetter, Frankfurt am Main, Germany

[73] Assignee: Farbwerke Hoechst Aktiengesellschaft vormals Meister Lucius & Bruning, Frankfurt am Main, Germany

[22] Filed: June 25, 1969

[21] Appl. No.: 836,573

[30] Foreign Application Priority Data

Aug. 30, 1968  Germany..........P 17 95 268.0

[52] U.S. Cl........260/88.2 R, 252/429 B, 252/429 C, 252/430, 260/94.9 C, 260/94.9 DA
[51] Int. Cl..............................C08f 1/56, C08f 3/06
[58] Field of Search.......................260/88.2, 94.9 C, 94.9 E, 94.9 DA

[56] References Cited

UNITED STATES PATENTS

| | | |
|---|---|---|
| 3,166,542 | 1/1965 | Orzechowski et al. .... 260/93.7 |
| 3,214,417 | 10/1965 | Bloyaert et al. ..........260/94.9 |
| 2,881,156 | 4/1959 | Pilar et al. ................260/94.9 |

FOREIGN PATENTS OR APPLICATIONS

| | | |
|---|---|---|
| 1,560,467 | 2/1969 | France |
| 6,714,024 | 4/1968 | Netherlands |

*Primary Examiner*—James A. Seidleck
*Assistant Examiner*—Edward J. Smith
*Attorney*—Connolly and Hutz

[57]  ABSTRACT

Process for homo- and copolymerizing olefins in the presence of mixed catalysts, one component of which is prepared by reacting magnesium compounds containing OH-groups with aldehydes and subsequently with tetravalent titanium compounds, and the second compound of which is an organo-aluminum compound. Already under a pressure of less than 20 atmospheres the yields per catalyst are so high that the catalyst remainders in the polymer need not be removed. Moreover, the polymers have a particle size distribution which is favorable for their processing.

7 Claims, No Drawings

PROCESS FOR THE POLYMERIZATION OF OLEFINS

The present invention provides a process for the polymerization of olefins in the presence of an improved catalyst.

It is known to polymerize α-olefins and mixtures thereof according to the low pressure process of Ziegler. The catalysts used in this process are made from mixtures of compounds of the elements of sub-groups IV to VI of the Periodic Table and organo-metal compounds of the elements of main groups I to III of the Periodic Table.

Furthermore, processes wherein the catalysts are used in combination with carrier materials are also known.

Belgian Pat. No. 609,261 proposes, as carrier material, alkaline earth metal phosphates which have to be heated to 200 – 1,000° C with titanium or vanadium compounds prior to the reaction in order to obtain relatively active polymerization catalysts. However, the polymerization yields are very poor.

French Pat. No. 1,448,320 discloses bivalent metal-hydroxy chlorides of the general formula HO-Me-Cl as carrier material for the Ziegler catalysts. To obtain higher polymerization yields, the polymerization has, however, to be carried out at a pressure of about 20 atmospheres.

According to German Pat. No. 1,214,653, pyrogenic metal or metalloid oxides that contain hydroxy groups on their surfaces are used as carrier material. However, even at pressures of 190 atmospheres, polymerization yields are so poor that it is absolutely necessary to remove the catalyst and the carrier material subsequently in order to obtain a useful product.

On an industrial scale, however, polymerizations according to the Ziegler process using catalysts on carrier material are only interesting if the polymers can be processed without having to remove the catalyst or the carrier material. This is possible only if high polymerization yields are obtained per catalyst or carrier unit. Especially a high halogen content in the polymer may lead to decoloration of the product or to corrosion damage of the processing machines.

The present invention provides a process for polymerizing ethylene or copolymerizing ethylene with up to 10 percent by weight, preferably up to 5 percent by weight, of α-olefins of the general formula R—CH $=$ CH$_2$ in which R stands for a branched or straight-chain hydrocarbon radical having 1 to 12, preferably one to eight, carbon atoms, in solution, in suspension or in the gaseous phase, at temperatures of from 20° to 120° C, preferably from 60° to 100° C, under pressures of up to 20 atmospheres, preferably from 1 to 8 atmospheres, in the presence of a mixed catalyst consisting of a titanium-containing carrier component (component A) and an organo-aluminum compound (component B), optionally with the control of the molecular weight by means of hydrogen, which process comprises carrying out the polymerization in the presence of a mixed catalyst, the component A of which is prepared by reacting a magnesium compound containing OH-groups first with an aldehyde of the general formula RCHO in which R is hydrogen or a hydrocarbon radical having one to eight carbon atoms, and subsequently with a tetravalent titanium compound.

Belgian Pat. No. 650,679 explicitly points out that no active catalysts can be obtained using, instead of Cl-Me-OH, metal compounds that contain further bivalent hydroxy groups, as carrier material.

Therefore, it is surprising and not obvious that the reaction of magnesium compounds containing further OH-groups and which may also be free from halogen with aldehydes and then with tetravalent compounds yields especially active catalysts supported on carrier material, which lead to very high polymerization yields even at a pressure of from 2 to 7 atmospheres.

As transition metal compound suitable for the preparation of component A there are used tetravalent titanium compounds, for example ortho-titanic acid esters which can be derived from the formula mentioned below, if $n$ is 0 and R stands for the meaning given below.

Halogenated tetravalent titanium compounds are preferably used, for example titanium halides or halotitanic acid esters of the general formula $TiX_n(OR)_{4-n}$ in which $n$ stands for 1 to 4, X stands for chlorine or bromine and R for identical or different hydrocarbon radicals, especially straight-chain or branched alkyl groups having one to 18, preferably one to eight, carbon atoms.

Examples thereof are $TiCl_4$, $TiBr_4$, $Ti(OC_2H_5)Cl_3$, $Ti(OC_2H_5)_3Cl$, $Ti(OC_3H_7)_3Cl$, $Ti(OiC_3H_7)_3Cl$, $Ti(OC_3H_7)Cl_3$ or $Ti(OiC_4H_9)_3Cl$.

Especially advantageous are alkoxy-titanates of the specified formula in which $n$ is 2 and R represents identical or different straight-chain or branched alkyl groups having two to eight carbon atoms.

Examples thereof are $Cl_2Ti(OC_2H_5)_2$, $Cl_2Ti(OC_3H_7)_2$, $Cl_2Ti(OC_4H_9\text{-}i)_2$, $Cl_2Ti(OC_6H_{13})_2$ and, especially $Cl_2Ti(OC_3H_7\text{-}i)_2$.

The magnesium compounds containing hydroxy groups, such as magnesium hydroxide, magnesia(Sorel)-cement or magnesium oxide containing hydroxy groups, magnesium carbonate, magnesium sulfate, magnesium carboxylate, magnesium chloride or magnesium phosphate may be prepared according to known methods.

For example, $Mg(OH)_2$ may be prepared by reacting alkali metal or alkaline earth metal hydroxides such as KOH, NaOH, LiOH, $Ca(OH)_2$, $Sr(OH)_2$, $Ba(OH)_2$, with aqueous solutions of magnesium salts such as $MgCl_2$, $MgSO_4$, $Mg(NO_3)_2$. The products obtained are then dried, for example by heating them to temperatures of from 100° to 220° C, if desired under reduced pressure.

Magnesium compounds containing hydroxy and carbonate groups are prepared, for example, by adding solutions of carbonates such as sodium carbonate or potassium carbonate, to aqueous solutions of magnesium salts such as $MgCl_2$, $MgSO_4$, $Mg(NO_3)_2$; mixtures of sodium carbonate solutions and hydroxide solutions, for example sodium hydroxide solution, may also be used.

The separated precipitates are washed, then dehydrated to a large extent and finally ground finely. Drying is suitably effected at temperatures of from 180° to 300° C, preferably from 190° to 250° C, if desired under reduced pressure. In this case, a content of hydroxy groups of from 30 to 500 mg, preferably from 50 to 400 mg, per gram of magnesium compound, corresponding to 0.15 – 1.7 mols, preferably 0.25 – 1.5 mols, of OH-groups per gram-atom of magnesium is suitable. However, a higher or lower hydroxy group-content is also possible.

The magnesium compounds containing hydroxy and sulfate groups obtained by an analogous reaction (cf. Gmelin, Handbuch der anorganischen Chemie, system No. 27, B, 8th edition, pages 276 – 278) are likewise heated to temperatures of from 180° to 300° C, preferably from 190° – 250° C, to dehydrate them to a large extent prior to the reaction with the aldehydes used according to the invention.

It is, however, also possible to use magnesium oxide sulfate cements which are formed by reacting aqueous $MgSO_4$-solutions with MgO and which are treated at temperatures of from 180° to 300° C, preferably from 190° to 250° C. The advantageous molar ratio of MgO : $MgSO_4$ is from 3 : 1 to 5 : 1.

The molar ratio of hydroxy groups in the magnesium compounds used according to the invention may vary within wide limits, it is advantageously from 1 : 1 to 20 : 1, preferably from 4 : 1 to 10 : 1; accordingly the ratio of hydroxy groups to magnesium is from 0.7 to 1.9, preferably from 1 . 3 to 1.7.

The magnesium compound containing hydroxy and carboxylate groups is also prepared by known methods. For example, $Mg(OH)_2$ can be reacted with carboxylic acids, for example in the form of their aqueous solutions. However, aqueous magnesium carboxylate solutions, for example magnesium acetate solutions, may also be stirred with MgO. The initially plastic paste solidifies after some time to form a concrete-like mass which is dried and subsequently finely ground. Drying may be effected at temperatures of from 130 to 150° C, preferably from 132° to 135° C.

Suitable for the preparation of these magnesium compounds containing hydroxy and carboxylate groups are mono- or polybasic saturated or unsaturated substituted or unsubstituted carboxylic acids or mixtures of different carboxylic acids.

Examples thereof are aliphatic carboxylic acid mixtures, such as obtained upon oxidation of paraffins, acrylic acid, methacrylic acid, oleic acid, stearic acid, mixtures of carboxylic acids as formed by the saponification of fats, or maleic acid, fumaric acid, terephthalic acid, isophthalic acid, trimellithic acid; preferably monobasic carboxylic acids of the formula $RCO_2H$ in which R stands for a branched or straight-chain alkyl radical or an aralkyl radical having one to 10 carbon atoms, or an aryl radical. Furthermore suitable are dibasic saturated carboxylic acids, such as oxalic acid, or those acids of the formula HOOC-R-COOH in which R stands for an unsubstituted or substituted alkyl radical having one to 10 carbon atoms, for example butyric acid, capric acid, cyclohexane-carboxylic acid, benzoic acid, succinic acid, adipic acid, especially preferred are acetic acid, propionic acid and oxalic acid.

The molar ratio of hydroxy groups to carboxylate groups in the magnesium compounds used according to the invention may vary within wide limits; advantageously within a range of from 10 : 1 to 1 : 2, preferably from 5 : 1 to 1 : 1, corresponding to 0.6 – 1.8, preferably 1.0 – 1.7 mols of OH-group per gram-atom of magnesium.

As magnesium chlorides containing hydroxy groups, there are preferably used those of the general formula $MgCl_2 . xMg(OH)_2$ in which $x$ is 3, which are prepared by reacting magnesium chloride with magnesium hydroxide, optionally with subsequent intense dehydration. The reaction may be carried out, for example, in such a manner that a mixture of $MgCl_2$ x 6 $H_2O$ and $Mg(OH)_2$, the molar ratio being at least 1 : 3, is heated to temperatures of from 180° to 250° C, preferably 200° to 240° C, suitably in stages so as first to heat the mixture of the two components to 100° – 140° C, preferably to slightly above the melting point of $MgCl_2$ x 6 $H_2O$, grind the product so obtained finely and subsequently dehydrate it to a large extent at temperatures of from 180° to 250° C, preferably from 200° to 240° C. When the mixture is heated to these temperatures in a single stage, there may be losses caused by quickly escaping water.

The basic magnesium chlorides may also be prepared by reacting aqueous $MgCl_2$-solutions with $Mg(OH)_2$ at a molar ratio of at least 1 : 3 at temperatures of from 20° to 100° C, evaporating the suspension, for example on the steam bath, and subsequently dehydrating the reaction product to a large extent.

This operation is suitably carried out in stages so as first to heat the reaction product to temperatures of from 100° to 120° C, then grind it finely and finally heat it to temperatures of from 180° to 250° C, preferably from 200° to 240° C.

The carrier materials used according to the invention and obtained according to the indicated methods may still contain a small amount of crystal water.

The molar ratio of $Mg(OH)_2$ to $MgCl_2$ in the preferably used basic magnesium chlorides of the above general formula may vary within wide limits above the value of 3, advantageously from 3 to 10, preferably from 3 to 5.

Magnesia cements (Sorel cements) may be prepared, for example, by reacting an aqueous about 3- to 5N-$MgCl_2$ solution with MgO at a molar ratio of from 1 : 3 to 1 : 8, preferably from 1 : 3 to 1 : 5. The initially plastic mixture solidifies after a short time to form a hard white mass (cf. Feinknecht, Helv. 10, 140 [1927]). The magnesia cement is subsequently dehydrated to a large extent, suitably by heating it in stages, first to temperatures of from 100° to 120° C, then by finely grinding it and finally once more subjecting it to thermal treatment at temperatures of from 180° to 300° C, preferably from 190° to 250° C.

Magnesium oxide containing hydroxy groups shall also mean, for example, technical-type magnesium oxide which always contains hydroxy groups.

In an idealized form, the reaction of these magnesium compounds containing hydroxy groups with aldehydes proceeds according to the equation:

$$-Mg-OH + RC(O)H \rightarrow -Mg-O-C(R)H-O-H$$

in which R stands for hydrogen or a saturated or unsaturated hydrocarbon radical, especially a branched or straight-chain alkyl radical having one to eight carbon atoms. Suitable aldehydes are, for example, formaldehyde, acetaldehyde, propionaldehyde, butyraldehyde or benzaldehyde, preferably formaldehyde.

Olefinically unsaturated monovalent aldehydes, such as acrolein or crotonic aldehyde, may also be used.

In general, the molar ratio of aldehyde to magnesium compound containing OH-groups is within the range of from 0.5 : 1 to 2 : 1. It is, however, also possible to use a larger or smaller amount of aldehyde per mol of magnesium compound containing hydroxy groups.

An appropriate content of hydroxy groups is from 100 mg per mol of magnesium compound up to that of pure $Mg(OH)_2$.

The average particle size of the carrier material is generally in the range of from 0.1 to 300 microns.

The magnesium compound containing the OH-groups may be reacted with the aldehyde in substance, in the case of a liquid aldehyde, or in solution or suspension. Suitable diluents are, for example, water or organic solvents such as alcohols, for example methanol, ethanol, propanol, or ketones, for example acetone, or esters, for example ethyl acetate, or halohydrocarbons, for example methylene chloride, chloroform or 1.2-dichloroethanes.

The reaction temperatures are advantageously within the range of from 10° to 150° C, preferably from 20° to 120° C. If the reaction is carried out in an aqueous system, temperatures of from about 15° to 30° C are preferable.

Subsequently, the reaction product is dried at temperatures of from 40° to 150° C, preferably from 60° to 120° C, optionally under reduced pressure.

For the preparation of the carrier material, i.e., for the reaction of the reaction product of the magnesium compound containing OH-groups and aldehyde with the tetravalent titanium compound the temperatures applied may be in the range of from about 0° to 200° C, the upper temperature limit corresponding to the decomposition temperature of the titanium compound used according to the invention. The temperature of from 40° to 120° C is advantageous.

This reaction may be carried out in the inert diluents which are currently used in the low pressure process, such as aliphatic or cycloaliphatic hydrocarbons, for example butane, pentane, hexane, heptane, cyclohexane, or hydrogenated diesel oil fractions as well as aromatic hydrocarbons, such as benzene or xylene. Gasoline- or hydrogenated diesel oil fractions which have been carefully freed from oxygen, sulfur compounds and moisture may also be used for this purpose.

Subsequently, the carrier material which is insoluble in hydrocarbons and safely fixed on the titanium compound used is freed from unreacted tetravalent titanium compound by washing it several times with one of the cited inert solvents.

The titanium content of component A may vary between 0.01 and 12 mmols of titanium compound, preferably between 0.1 and 5 mmols, per gram of component A. It can be controlled by means of the reaction conditions, such as reaction time and temperature or concentration of the titanium compound used or the proportion of carrier of titanium compound.

The concentration of the titanium component fixed on the magnesium compound is advantageously within the range of from 0.005 to 1.5, preferably from 0.03 to 0.8 mmols per liter of dispersing agent or reactor volume. Generally even higher concentrations may also be possible.

Prior to the reaction with the titanium compound, the reaction product of the Mg-compound containing hydroxy groups and aldehyde may be reacted with other inert inorganic solid substances that do not inhibit the polymerization, for example metal compounds, such as oxides, hydroxides, halides, sulfates, carbonates, phosphates, silicates, the metals being, for example, alkali earth metals, Zn, Cd, Ni, Al, Si or Ti.

Further solid substances to be used are, for example CaO, $Al(OH)_3$, $MgF_2$, $AlCl_3$, $ZnCl_2$, $NiCl_2$, $BaCO_3$, $Ca_3(PO_4)B_2$, apatite and talcum.

Thus, for example, an addition of $ZnCl_2$ or aluminum chloride permits an improved control of the supported catalyst by means of hydrogen.

The molar ratio of carrier material to inorganic solid substance may vary within wide limits; a range of from 1 : 0.05 to 1 : 0.9, preferably from 1 : 0.08 to 1 : 0.5, is advantageous.

The tetravalent titanium compound in component A is suitably converted during the polymerization into a compound having a lower valence and which is active for the polymerization, by means of the organo-aluminum compound (component B) at temperatures of from 20° to 120° C, preferably from 60° to 100° C.

It is, however, also possible to treat component A with the organo-aluminum compound at temperatures of from −30° to 100° C, preferably from 0° to 20° C, prior to the polymerization and then to use it for the polymerization. When halogenated organo-aluminum compounds are used, it is, however, suitable to wash the reaction product obtained and then to activate it by means of organo-aluminum compounds at temperatures of from 20° to 120° C, preferably from 60° to 100° C.

The organo-aluminum compounds used may be reaction products of aluminum-trialkyls or aluminum-dialkyl hydrides with hydrocarbon radicals having one to 16 carbon atoms, preferably $Al(iBu)_3$ or $Al(iBu)_2H$ and diolefins containing four to 20 carbon atoms, preferably isoprene; for example aluminum isoprenyl.

Furthermore suitable as component B are halogenated organo-aluminum compounds, for example dialkyl-aluminum monohalides of the formula $R_2AlX$ or alkyl-aluminum sesquichlorides of the formula $R_3Al_2X_3$, in which formula R stands for identical or different hydrocarbon radicals, preferably alkyl groups having one to 16 carbon atoms, preferably two to 12 carbon atoms and X stands for chlorine or bromine, for example $(C_2H_5)_2AlCl$, $(iC_4H_9)_2AlCl$, $(C_2H_5)_3Al_2Cl_3$.

It is advantageous to use, as component B, alumium-trialkyls of the formula $AlR_3$ or auminum-dialkyl hydrides of the formula $AlR_2H$, in which formula R stands for identical or different hydrocarbons, preferably alkyl groups having one to 16, preferably two to 6, carbon atoms, for example $Al(C_2H_5)_3$, $Al(C_2H_5)_2H$, $Al(C_3H_7)_3$, $Al(C_3H_7)_2H$, $Al(iC_4H_9)_3$ or $Al(iC_4H_9)_2H$.

The organo-aluminum activating agent may be used in a concentration of from 0.5 to 10 mmols, preferably from 2 to 4 mmols, per liter of dispersing agent or per liter of reaction volume.

The polymerization is carried out in solution, in suspension or in the gaseous phase, in continuous or discontinuous manner, at temperatures of from 20° to 120° C, preferably from 60° to 100° C. The pressures are up to 20 atmospheres, preferably from 1.5 to 8 atmospheres.

Suitable for the suspension polymerization are inert dispersing agents currently used for the low-pressure process of Ziegler and specified in detail further above for the preparation of component A.

The olefins used are ethylene or mixtures of ethylene with up to 10 percent by weight, preferably up to 5 percent by weight, of α-olefins of the general formula R—CH CH$_2$ in which R stands for a branched or straight-chain hydrocarbon radical, especially a straight-chain or branched substituted or unsubstituted alkyl group having one to 13, preferably one to eight, carbon atoms, preferably propylene, butene-(1), pentene-(1), 4-methyl-pentene-(1).

The molecular weights of the polymers can be controlled in known manner, preferably by means of hydrogen.

The great technical advantage of the process of the present invention over that disclosed in Belgian Pat. No. 650,679 and in French Pat. No. 1,448,320 resides in the fact that the polymerization can be carried out in a simpler manner since the supported catalysts of the invention permit high yields per catalyst already at a pressure of from 4 to 9 atmospheres, which is usual for the Ziegler polymerization, so that the supported catalyst can be left entirely in the polymer.

In the case of suspension polymerization, expensive operations such as decomposition of the catalyst or removal of the catalyst and carrier material, are, thus, no longer necessary. After filtration to separate the dispersing agent, the product obtained is dried and directly processed. The extremely small amounts of catalyst and carrier material do neither cause decoloration of the polymers nor corrosion damage of the processing machines.

For example, polymerization of ethylene in the presence of 1 g of the reaction product of magnesium compound containing hydroxy groups and aldehyde, after reaction with TiCl$_2$(OiC$_3$H$_7$)$_2$, provides a polymer yield of from 3 to 15 kg at a pressure of from 5 to 9 atmospheres.

In contrast thereto, for example according to the French patent, 1 g of MgOH · Cl supported on TiCl$_4$ permits a maximum yield of only 1.5 kg of polymer at a pressure of 20 atmospheres.

Another substantial advantage of the process of the invention is the preparation of polymers having a very narrow molecular weight distribution and interesting technological properties, the Mw/Mn-values being between 2 and 6, if the preferably mentioned chloralkoxy-titanates-(IV) of the formula TiCl$_n$(OR)$_{4-n}$ in which n is 2 and R stands for identical or different alkyl groups having two to eight carbon atoms are used.

The products thus obtained have excellent color and corrosion values and are especially suitable for the production of injection-molded articles.

Moreover, the polymers prepared in the presence of the supported catalysts of the invention have a particle size distribution which is most favorable for their workup (filtration, drying) as well as for their processing. For example, the particle size is mainly within the range of from 300 to 750 µ, but it can also be varied within wider or narrower limits. This control of the particle size of the polymer is of great industrial importance since, depending on the intended use of the polymer, sometimes fine-grained, sometimes coarse-grained polymers are required.

Thus, low-pressure polyethylenes having a relatively high molecular weight and a small particle size (25 – 250 µ) are required for the production of homogeneously colored sheets of high impact strength or of porous bodies, for example filter plates or semi-finished products. Relatively coarse-grained materials (300 – 700 µ) are preferably used for directly extruding or injection-molding low-pressure polyethylene powders. These materials are easier to feed into the processing machines, they do not dust when handled and have a good flow.

The following examples serve to illustrate the invention, but they are not intended to limit it thereto.

EXAMPLE 1

I. Preparation of the Supported Catalyst a. 80 g of MgO("leicht," by Messrs. Merck AG., Germany) having an apparent density of about 130 g/l were stirred with 800 ml of water and 600 ml of a 40 percent-aqueous formaldehyde solution for 24 hours. Subsequently, the aqueous phase was removed by filtration. The isolated solid product was dried at 80° C in vacuo. It contained 29 percent of Mg, 13.9 percent of C and 4.6 percent of H, corresponding to a compound having the analytical composition HO-Mg-O-CH$_2$-OH.

b. 20 g of the carrier prepared according to I (a) were heated to 80° C within 6 hours, while stirring under a nitrogen atmosphere, together with 200 ml of a 2-molar Cl$_2$Ti(OC$_3$H$_7$-i)$_2$-solution in a hydrogenated diesel oil fraction boiling between 140° and 160° C. A faintly brownish suspension was formed, the solid substance of which was freed from excess titanium compound by washing it 7 times and decanting it with 250 ml of hydrogenated diesel oil. The titanium content of the washed suspension was determined colorimetrically by means of hydrogen peroxide (cf. G.O. Muller, Praktikum der quant. chemischen Analyse, 4th edition (1957), page 243). 1 g of carrier material contained 1.2 mmols of titanium compound.

II. Polymerization of Ethylene

In a vessel having a capacity of 150 l, air was evacuated by flushing with nitrogen, then 100 l of hydrogenated diesel oil boiling between 140° and 160° C as well as 34.3 g (300 mmols) of triethyl-aluminum in 400 ml of diesel oil were fed into the vessel and then the whole was heated to 85° C. Subsequently, 8 g of the supported catalyst prepared according to I(a) and (b) in 200 ml of diesel oil were added and the polymerization of ethylene was carried out at 85° C (ethylene feed: about 5.5 kg/hour). The molecular weight was controlled by means of hydrogen. The gaseous phase contained 46 percent. After 8 hours of polymerization the pressure in the vessel increased to 7 atmospheres. Then the dispersing agent was separated from the polyethylene using a pressure filter and the polyethylene was dried. Yield 40 kg. Reduced specific viscosity (measured on 0.1 percent in a solution of decahydronaphthalene at 135° C): 1.27.

The polymer exhibited excellent color and corrosion values and, as a powder, could be directly processed in injection molding machines.

Particle size distribution of the powder determined by sieve-analysis:

<50 µ:0.5%
50–150 µ:4.3%

150–300 µ:4.6%
300–500 µ:45%
500–750 µ:42
>750 µ:3.5% a. The carrier was prepared according to I(a) in Example 1, except that it was not dried at 80° C but at 120° C in vacuo. Further reaction with $Cl_2Ti(OC_3H_7\text{-}i)_2$-solution as in Example 1 I(b) led to a supported catalyst containing 0.9 mmol of titanium compound per gram of carrier material.

b. Polymerization of ethylene according to II of Example 1 with 10 g of the supported carrier prepared according to (a) of Example 2 yielded 40 kg of polyethylene having a reduced specific viscosity of 1.7, with the use of about 42 percent of $H_2$ in the gaseous phase. Particle size distribution determined by sieve-analysis:
<50 µ:1.2%
50–150 µ:5.7%
150–300 µ:29.2%
300–500 µ:52.8%
500–750 µ:8.9%
>750 µ:2.1 %

EXAMPLE 3

I. Preparation of the Supported Catalyst a. 40 g of magnesium oxide, "extra leicht," having an apparent density of about 85 g/l were refluxed while stirring for 20 hours with 30 g of paraformaldehyde, 300 ml of methyl alcohol, 10 ml of distilled water and a drop of phosphoric acid (80 percent strength). Subsequently, the solid substance was separated from the soluble phase by filtration and dried at 80° C in vacuo. The analysis showed 10.4 percent of C, 3.6 percent of H and 36.8 percent of Mg. This corresponded to a molar ratio of Mg : C of 1.8 : 1.

b. 20 g of the substance prepared according to I(a) were heated while stirring for 8 hours at 80° C with 200 ml of a 2-molar $Cl_2Ti(OiC_3H_7)_2$-solution, under a nitrogen atmosphere. Subsequently, the suspension was washed with hydrogenated diesel oil boiling between 130° and 160° C until the liquid phase was free from titanium compound. The titanium content in the washed suspension was determined colorimetrically according to Example 1 I(b). It was 1.0 g of titanium compound per gram of carrier.

II. Polymerization of ethylene

100 Liters of hydrogenated diesel oil boiling between 140° and 160° C were introduced into a 150 l - vessel, the air was evacuated by means of nitrogen and the contents of the vessel were heated to 85° C. 45.7 g (400mmols) of triethyl-aluminum and 10 g of the supported catalyst in 120 ml of diesel oil, which had been prepared according to I(a) and (b) and treated at 60° C for 2 hours with 2.2 g (20 mmols) of triethyl-aluminum prior to feeding into the vessel, were added. The polymerization of ethylene was then carried out at 85° C. The hydrogen content of the gaseous phase amounted to 44 – 45 percent by volume. After 8 hours of polymerization the pressure in the vessel had increased to 6.5 atmospheres. After filtration and drying the yield of polyethylene was 41 kg. The reduced specific viscosity (measured on 0.1 percent in a solution of decahydronaphthalene) was 1.33.

Particle size distribution of the powder determined by sieve-analysis:
<50 µ:2.2%
50–150 µ:12.1%
150–300 µ:10.4%
300–500 µ:10.5%
500–750 µ:17.0%
>750 µ:46.8%

I. Preparation of the Supported Catalyst a. 30 g of magnesium oxide, "extra leicht," having an apparent density of about 85 g/l were refluxed while stirring for 20 hours with 250 ml of ethyl acetate, 25 g of paraformaldehyde and 1 drop of phosphoric acid of 80 percent strength. Subsequently, the solid product was isolated by suction-filtration, washed with 400 ml of ethyl acetate and dried at 80° C in vacuo. The analysis showed C = 4.8 percent, H = 2.8 percent, Mg = 37.7 percent.

b. 20 g of the carrier prepared according to I(a) were heated while stirring to 80° C for 6 hours under a nitrogen atmosphere with 200 ml of a 2-molar $Cl_2Ti(OC_3H_7\text{-}i)_2$-solution (in a hydrogenated diesel oil fraction boiling between 140° and 160° C). Subsequently, the product was washed 9 times and decanted from the solid substance and the titanium content was titrated as in Example 1 I(b). 1 g of carrier material contained 3 mmols of titanium compound.

II. Polymerization of Ethylene 500 ml of hydrogenated diesel oil were fed into a 1 l-glass autoclave, air was evacuated by means of hydrogen, 0.57 g (5 mmols) of triethyl-aluminum were added and the contents of the vessel were heated to 85° C. After addition of 0.1 g of supported catalyst as a suspension in 1.25 ml of hydrogenated diesel oil as prepared according to I(a) and (b), hydrogen was pressurized up to a pressure of 4 atmospheres, then ethylene was fed in until a pressure of 7 atmospheres was reached. Ethylene which had polymerized while stirring was continuously replaced so that the pressure remained constant at 7 atmospheres. After 90 minutes, polymerization was discontinued, the polyethylene was separated from the diesel oil by filtration and dried. Yield: 100 g having a reduced specific viscosity (measured on 0.1 percent in a solution of decahydronaphthalene) of 1.39.

EXAMPLE 5

(in comparison to Example 4)

I. Preparation of the Carrier Material a. 100 g of $MgCl_2 \cdot 6 H_2O$ were heated to 285° C for 6 hours in a muffle furnace, the product was then ground to yield an extremely fine powder which was once more heated to 250° C for 2 hours. The powder which was still hot was stored under exclusion of air.

b. Under an atmosphere of nitrogen, 20 g of the ClMgOH prepared according to I(a) were heated while stirring to 80° C for 4 hours with 150 ml of a 2-molar $Cl_2Ti(OC_3H_7\text{-}i)_2$-solution in hydrogenated diesel oil boiling between 140 and 160° C. Titanium compound which was not fixed on the carrier material was eliminated by washing it 7 times with hydrogenated diesel oil and decanting. The titration according to Example 1, I(b) showed 5.2 mols of titanium compound per gram of carrier material.

II. Polymerization of Ethylene

This polymerization was carried out according to Example 4 II, using 0.1 g of supported catalyst in 1.25 ml of hydrogenated diesel oil, prepared according to Example 5 I(a) and (b). Yield 32 g of polyethylene having a reduced specific viscosity of 1.41.

EXAMPLE 6

I. Preparation of the Supported Catalyst a. 20 g of magnesium oxide, "extra leicht," having an apparent density of about 100 g/l were refluxed while stirring for 20 hours with 35 g of freshly distilled acetaldehyde and 150 ml of technical-type methanol. After cooling the product was filtered off and the solid residue was dried at 80° C in vacuo. The analysis of the solid substance showed: 19.2 percent of C, 4.4 percent of H and 26.9 percent of Mg; i.e., 1 mol of Mg-compound contained about 0.7 mol of acetaldehyde.

b. Under an atmosphere of nitrogen, 10 g of the carrier prepared according to Example 6 I(a) were heated while stirring to 80° C for 8 hours with 150 ml of a 2-molar $Cl_2Ti(OC_3H_7$-$i)_2$-solution in hydrogenated diesel oil boiling between 140° and 160° C. Subsequently, the precipitate was washed by decanting and stirring with diesel oil until the solution overlying the solid substance was free from titanium compound. The titanium content of the suspension was determined according to Example 1 I(b). It was 4.5 mmols of Ti per gram of carrier.

II. Copolymerization of Ethylene and Butene

In a 150 1-vessel, air was evacuated by flushing with nitrogen and 100 l of hydrogenated diesel oil boiling between 140 and 160° C, and 45.7 g (400 mmols) of triethyl-aluminum in 200 ml of diesel oil were fed into the vessel and the contents of the vessel were heated to about 85° C. Subsequently, the total amount of the supported catalyst prepared according to Example 6 I(b) in 200 ml of diesel oil was added and the polymerization was carried out at 85° C. About 6 kg of ethylene and 120 g of butene per hour as well as such an amount of hydrogen were fed in that the hydrogen portion in the gaseous phase amounted to about 12 percent. Within 6 hours the pressure increased to 8 atmospheres. The ethylene-butene copolymer was then separated from the dispersing agent by filtration and dried. About 35 kg of copolymer having a reduced specific viscosity of 2.8 (measured on 0.1 percent in a solution of decahydronaphthalene at 135° C), and a density of 0.939 g/cc. were obtained.

EXAMPLE 7

I. Preparation of the Supported Catalyst a. The carrier prepared in Example 1 I(a) was used.

b. Under an atmosphere of nitrogen, 10 g of the carrier prepared according to Example 1 I(a) were heated while stirring to 80° C for 10 hours with 100 ml of a 2-molar $Cl_3Ti(O$-2-ethyl-hexyl$)$-solution in hydrogenated diesel oil boiling between 140° and 160° C. Subsequently, the suspension was freed from excess titanium compound soluble in diesel oil by washing with diesel oil and decanting and then concentrated to a volume of 100 ml. The colorimetrical determination of titanium according to Example 1 I(b) showed 1.4 mmols of titanium compound per gram of carrier material.

II. Polymerization in the Gaseous Phase a. 400 g of polyethylene (reduced specific viscosity: 2.7; apparent density: 420 g/l) were fed into a 10 1-reactor provided with a stirrer the stirring means of which scraped along the inner wall of the reactor, and then air was expelled from the reactor by repeated evacuation, ventilation and flushing with an ethylene-hydrogen mixture. After heating the reactor contents to 85° C and addition of 6.8 g (60 mmols) of triethyl-aluminum and of 2 ml of the catalyst suspension prepared according to Example 7, I(b) polymerization was effected by feeding in about 350 g of ethylene per hour and such an amount of hydrogen that the hydrogen portion in the gaseous phase amounted to 10 percent by volume. After 11 hours the pressure increased to 9 atmospheres. 4 kg of polyethylene having a reduced specific viscosity of 3.1 (measured on 0.1 percent in a solution of decahydronaphthalene at 135° C), were obtained.

We claim:

1. In the process of polymerizing ethylene or mixtures of ethylene with up to 10 percent by weight of $\alpha$-olefins of the formula $$R-CH = CH_2$$

in which R is a branched or straight-chain hydrocarbon radical having one to 13 carbon atoms, in solution, in suspension or in the gaseous phase at temperatures of from 20° to 120° C., under pressures of up to 20 atmospheres in the presence of a mixed catalyst comprising a titanium-containing component (component A) and an organo-aluminum compound (component B), the improvement which consists essentially of using as component A of the mixed catalyst the reaction product of magnesium hydroxide with an aldehyde of the formula $$R^1CHO$$

which is subsequently reacted with a tetravalent titanium compound, said $R^1$ being hydrogen or a saturated or unsaturated hydrocarbon radical having one to eight carbon atoms, said tetravalent titanium compound being titanium halide or an ester of the formula $$X_nTi(OR^2)_{4-n}$$

wherein $n$ is 1 to 4, X is chlorine or bromine and each $R^2$ is a hydrocarbon radical having one to 18 carbon atoms, the molar ratio of said aldehyde to magnesium hydroxide being from 0.5:1 to 2:1 and the titanium content of component A being between 0.01 and 12 mmols of titanium compound per gram of component A.

2. The process of claim 1 wherein said aldehyde is formaldehyde.

3. The process of claim 1 wherein an ester of the formula $$Cl_2Ti(OR^3)_2$$

wherein each $R^3$ is alkyl having two to eight carbon atoms is employed as said tetravalent titanium compound.

4. The process of claim 1 wherein component B is of the formula $$Al(R^4)_3 \text{ or } Al(R^4)_2H$$

wherein each $R^4$ is hydrocarbon having one to 16 carbon atoms.

5. The process of claim 1 wherein mixtures of ethylene with up to 10% by weight of $\alpha$-olefins of the formula $$R-CH=CH_2$$

in which R is alkyl having one to eight carbon atoms are polymerized.

6. The process of claim 1 wherein ethylene is copolymerized with propylene, butene-(1) or 4-methyl-pentene-(1).

7. The process of claim 1 wherein the molecular weight of the resulting polymer is regulated by means of hydrogen.

* * * * *